United States Patent
Kurtzberg et al.

[11] Patent Number: 6,167,332
[45] Date of Patent: Dec. 26, 2000

[54] METHOD AND APPARATUS SUITABLE FOR OPTIMIZING AN OPERATION OF A SELF-GUIDED VEHICLE

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 09/239,349

[22] Filed: Jan. 28, 1999

[51] Int. Cl.[7] .................................................. G05D 1/00
[52] U.S. Cl. .............................. 701/23; 701/26; 701/207; 701/214; 318/568.12
[58] Field of Search .................................. 701/23, 24, 26, 701/28, 207, 209, 214, 223; 318/568.12; 180/167, 168, 169

[56] References Cited

U.S. PATENT DOCUMENTS

| | | | |
|---|---|---|---|
| 4,891,762 | 1/1990 | Chotiros | 701/223 |
| 5,111,401 | 5/1992 | Everett et al. | 701/24 |
| 5,170,352 | 12/1992 | McTamaney et al. | 701/26 |
| 5,172,317 | 12/1992 | Asanuma et al. | 701/28 |
| 5,283,739 | 2/1994 | Summerville et al. | 701/23 |

*Primary Examiner*—William A. Cuchlinski, Jr.
*Assistant Examiner*—Gertrude Arthur
*Attorney, Agent, or Firm*—McGuireWoods LLP; Stephen C. Kaufman, Esq.

[57] ABSTRACT

Method suitable for optimizing an operation of a self-guided vehicle. The method includes steps for incorporating a self-guided capability as part of the operation of the vehicle, the operation further including a mapping technique for soliciting information required for vehicle motion from a first to a second predetermined location. The method then requires dynamically assessing a global optimal path referenced to the first and second locations, and dynamically affecting vehicle motion, by actions premised upon re-evaluating the global optimal path in light of instantaneous vehicle motion, by refining the global optical path so that the vehicle can follow a localized path trajectory which optimizes the refined global path.

9 Claims, 5 Drawing Sheets

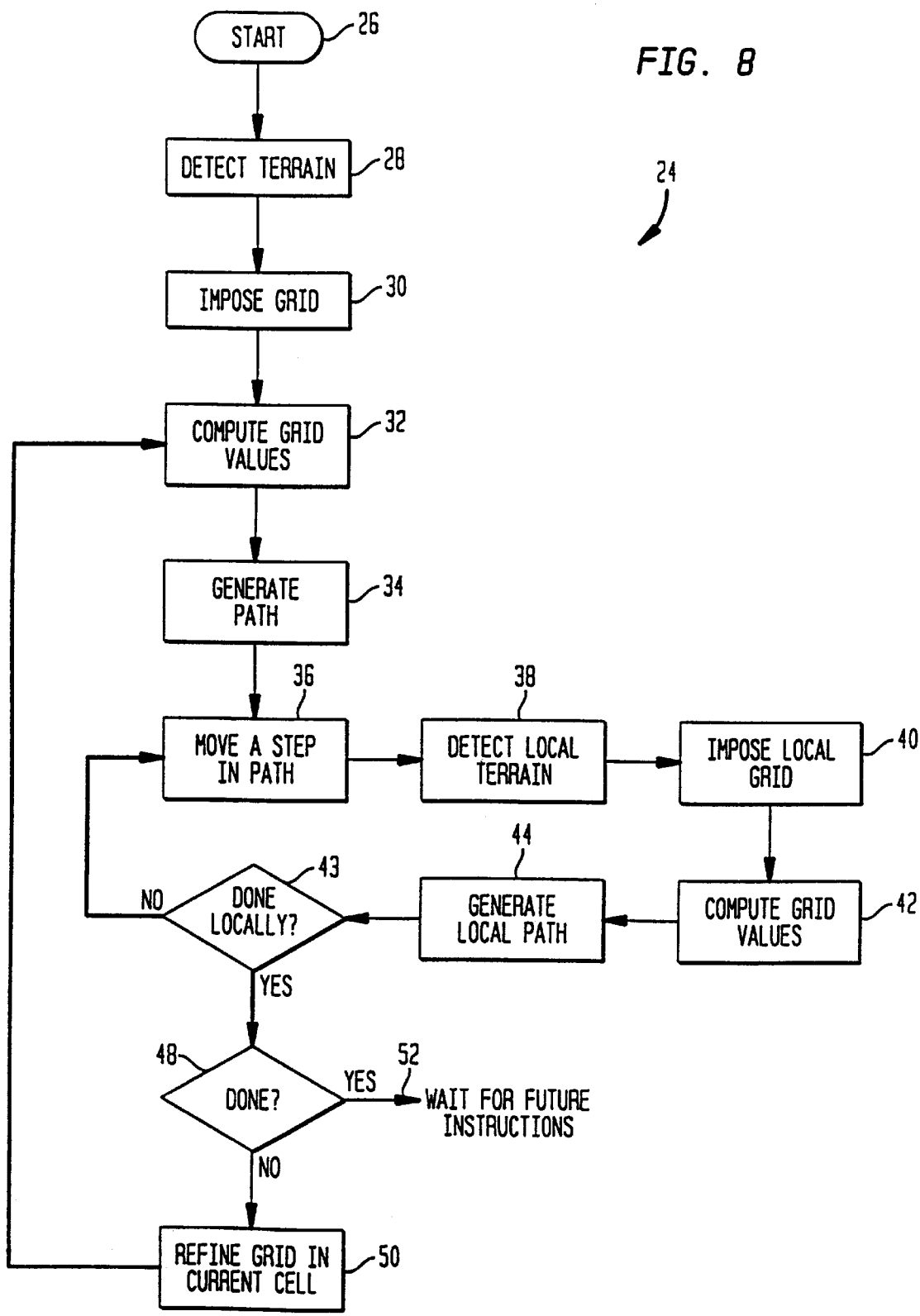

METHOD AND APPARATUS SUITABLE FOR OPTIMIZING AN OPERATION OF A SELF-GUIDED VEHICLE

FIELD OF THE INVENTION

This invention relates to method and apparatus suitable for optimizing an operation of a self-guided vehicle.

INTRODUCTION TO THE INVENTION

It is known to use exploratory vehicles in order to interrogate terrain hostile to human life. For example, the Mars Rover has been successfully used on the surface of Mars for scientific studies.

Currently, a method of operation of such an exploratory vehicle includes the steps of detecting terrain features, in particular, obstacles, and transmitting the information to humans, who then are responsible for determining the maneuvering path for the vehicle by transmitting appropriate maneuvering instructions to the vehicle.

SUMMARY OF THE INVENTION

We note that the method of operation just recited is such that the determination of the maneuvering path of the vehicle does not reside within the exploratory vehicle, and cannot be enabled by the exploratory vehicle, per se.

The present invention, in sharp contrast, discloses novel methodology and apparatus for incorporating a self-guided capability as an included aspect of vehicle operation per se; the methodology moreover, advantageously enabling an optimal path trajectory for the exploratory vehicle.

In a first aspect, the present invention discloses a method suitable for use for optimizing an operation of a self-guided vehicle, the method comprising the steps of (i) incorporating a self-guided capability as part of the operation of the vehicle comprising at least one mapping technique for soliciting information required for vehicle motion from a first to a predetermined second location;

(ii) dynamically assessing a global optimal path referenced to said first and second location based on said at least one mapping technique;

and (iii) dynamically affecting vehicle motion by first reevaluating step (ii) global optimal path in light of instant vehicle motion and secondly refining said global optimal path so that the vehicle motion can follow a localized path trajectory which can optimize the refined global path.

Preferably, step (1) comprises incorporating a self-guided capability by providing at least one sensor, for example, wherein a sensor is selected from the group consisting of an electromagnetic sensor, a chemical sensor, and an audio sensor.

Preferably, at least one mapping technique includes a typographic map referencing the first and second locations.

Preferably, the global optical path comprises selecting a cost function, for example, a cost function that subsumes at least one of transit-time of vehicle operation, fuel consumption of vehicle operation, and responsiveness to mechanical, electrical, or chemical constraints. In particular, the method may comprise a step of assessing a pertinent cost function in light of instant vehicle motion, for dynamically assessing the global optimal path.

In a second aspect, the present invention discloses a program storage device readable by a machine, tangibly embodying a program of instructions executable by the machine to perform method steps for optimizing an operation of a self-guided vehicle, said method steps comprising:

(i) incorporating a self-guided capability as part of the operation of the vehicle comprising at least one mapping technique for soliciting information required for vehicle motion from a first to a predetermined second location;

(ii) dynamically assessing a global optimal path referenced to said first and second location based on said at least one mapping technique;

and (iii) dynamically affecting vehicle motion by first reevaluating step (ii) global optimal path in light of instant vehicle motion and secondly refining said global optimal path so that the vehicle motion can follow a localized path trajectory which can optimize the refined global path.

In a third aspect, the present invention discloses a computer system suitable for use for optimizing an operation of a self-guided vehicle, the computer system including:

(i) means for inputting information required for a self-guided operation of the vehicle;

(ii) CPU means for operating on the input information for generating a map required for vehicle motion from a first to a second predetermined location;

(iii) CPU means for converting information in the map into first motion instructions to the self-guided vehicle;

(iv) CPU means for dynamically assessing a global optimal path referenced to said first and second locations based on the at least one mapping technique;

(v) CPU means for dynamically affecting vehicle motion by first reevaluating the global optimal path in light of instant vehicle motion and secondly refining said global optimal path so that the vehicle motion can follow a localized path trajectory which can optimize the refined global path;

and (vi) CPU means for converting the localized path trajectory into second motion instructions to the self-guided vehicle.

BRIEF DESCRIPTION OF THE DRAWINGS

The invention is illustrated in the accompanying drawing, in which:

FIG. 8 provides a flowchart for realization of the present invention.

DETAILED DESCRIPTION OF THE INVENTION

Figure 1:
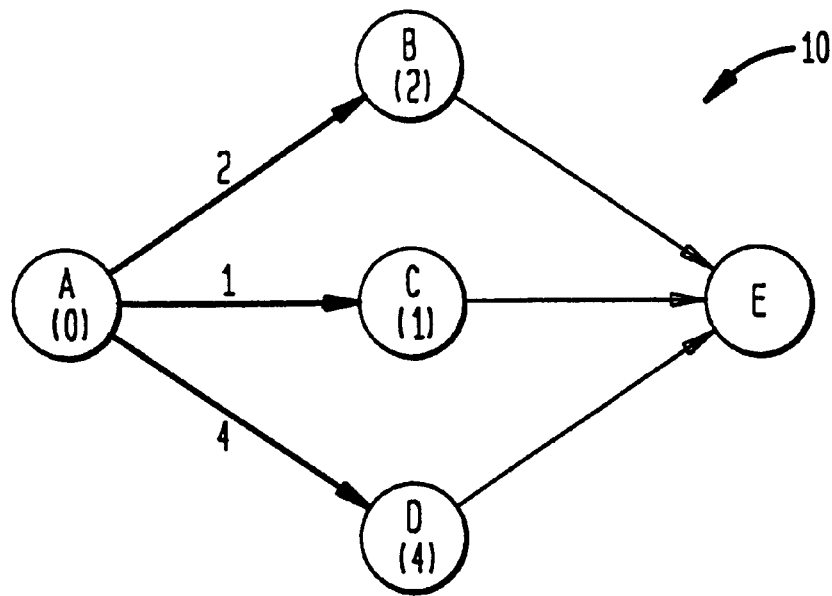
FIGS. 1–3 provide heuristic graphs used for developing the method of the present invention.

The invention, as summarized above, discloses a method and system for a self-guided vehicle capable of operating without direct human intervention in a foreign, sometimes hostile terrain. The vehicle is to maneuver from its current location to some distant target location. The pass or trajectory it takes must be one that presents minimal impediments to its travels. Such a trajectory is termed an optimal path.

The vehicle preferably has sensors for detecting characteristics of the terrain in its neighbourhood. Specifically, the level of discrimination is such as to detect relevant obstacles and other features and general conditions which may affect its desired path. The sensors may include standard Radar, Sonar, Optical, Video, and Audio sensors capable of the required resolution detection.

With these sensors, a map of the region encompassing the vehicle and its target destination, may be created. Preferably, the map is a contour map which contains the elevations of different objects, path gradients, and all other relevant geometries. It also preferably includes ground conditions such as granularity, muddiness etc.

Preferably, a p+1 by q+1 grid which creates a p by q array of cells is now imposed on the terrain map. The location of the vehicle is in a particular cell, and the target is located in another cell. These cells are not in general at the edge of the constructed map and grid. The vehicle moves from cell to cell from its current location to its target location, following a path of least resistance (minimum cost) to its movement, as described below.

Grid mesh (cell) size preferably is selected to be sufficiently small so as to offer sufficient discrimination of local conditions and features of the terrain. The total grid size may be determined by the vehicle's computer, and is subject to refinement and re-evaluation, as the vehicle proceeds towards its target. Initially, the cell size is relatively coarse, and later, becomes relatively fine as the vehicle approaches its target cell. Further, each cell can be treated hierarchically as an entity subject to imposition of its own mapping grid.

Preferably, each cell has a non-negative number associated with it, said number representing the difficulty of traversing that cell. The larger the value, the more difficult it is to traverse. These numbers reflect the difficulty in traversing that cell using a given cost function. Several cost functions are available. These include: time, fuel, vibration-levels, and other relevant functions, and mixtures of these functions. The choice of the active function(s) is dynamic and can change during vehicle motion.

Preferably, a weighted-edge graph is constructed from the cells of the array. The nodes of this graph designate the cells, and the connecting edges represent the linkages to adjacent cells that can be directly reached. The value of a weighted edge x, y which is the edge connecting node x to node y, is assigned the value of the cell associated with node y.

This value is designated by v(x, y). Further, if v(x, y) exceeds a predetermined tolerance, which implies that the vehicle cannot possibly travel from cell x to cell y, than the edge x, y is deleted from the graph.

The root node of the graph is associated with the cell in which the vehicle is currently located. The task for the vehicle is to traverse from the root node to the target node i.e., the node representing the target cell, so as to minimize the sum of the weighted graph edges of the traversed nodes.

To affect this task, the following procedure preferably is employed, which procedure determines the minimum-cost (resistance) path to all nodes that can be reached from the root node:

A recursive formula is used. The recursion formula is:

$$v(Y) = \min \{v(Xi) + v(Xi, Y)\}$$

for all Xi such that Xi directly connect to y.

This procedure is executed for all Y which advances to the target. The initial Xi(I=0) is the root node and its cost is v(X0).

Computation of this minimum path tree resulting from the above procedure establishes a connection from the root node (origin) to the target node. The specific path to guide the vehicle is established by noting that the target node has a unique predecessor node leading to it. That predecessor node, in turn, has a unique predecessor node, and so forth, until the root node is reached. The series of predecessor nodes forms a chain of nodes leading from the root to the target node, and is supplied to the vehicle.

If the target node associated with the target cell is not reachable by this procedure, then the implication is that the graph containing the root node and the target node is not connected; that is, there is no possible path from the root node to the target node. Such information is supplied to the control base (humans).

Figure 2:
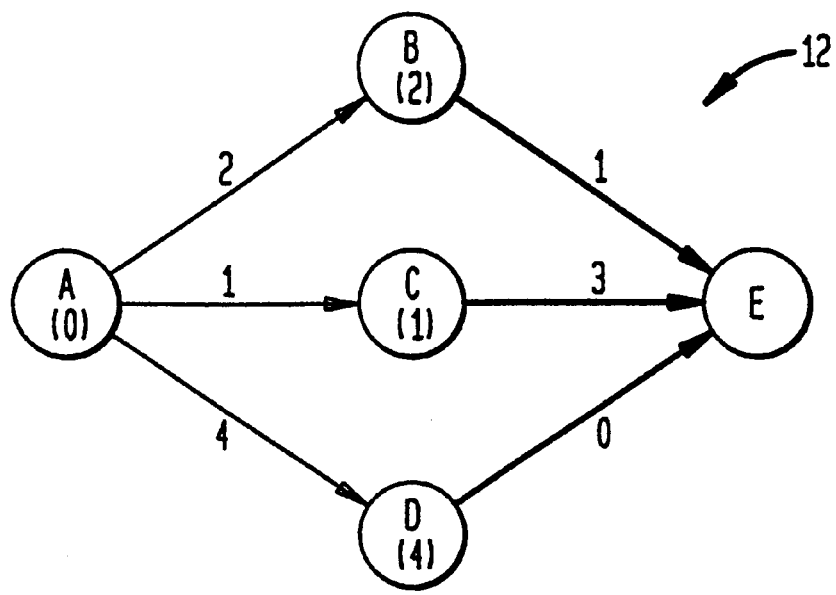

The procedure can be viewed as consisting of two basic cases: One in which there are edges leading from a given node to other nodes (FIG. 1, numeral 10) and the other, in which a given node is reached by one or more nodes, as shown in FIG. 2, numeral 12.

In the first case of a node leading directly to other nodes, the path to all of the nodes is fully determined, and the successor node receives the value of the sum of the value of the predecessor node and the value of the connecting edge.

Figure 3:
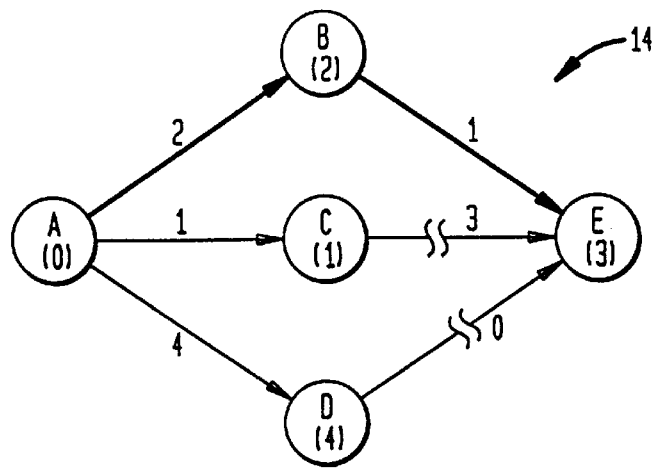

In the second case, only one of the plurality of nodes that lead directly to a node is employed while all of other edges leading to that node are deleted. The successor node receives the value of sum of the value of its unique (accessible) predecessor node plus the value of the non-cut connecting edge. FIG. 3, numeral 14, illustrates the combination of the two cases, in which the minimum path is depicted by the dark arrows.

Figure 4:
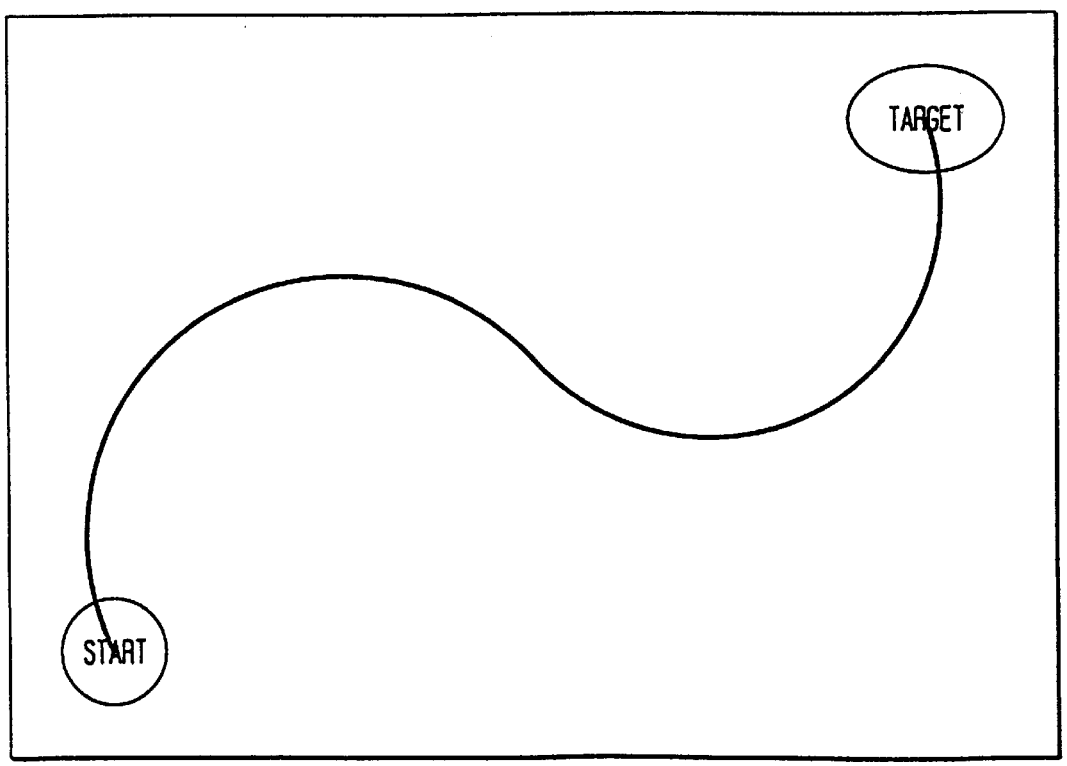
FIGS. 4–7 provide vehicle trajectory paths developed in accordance with principles of the present invention.
Figure 5:
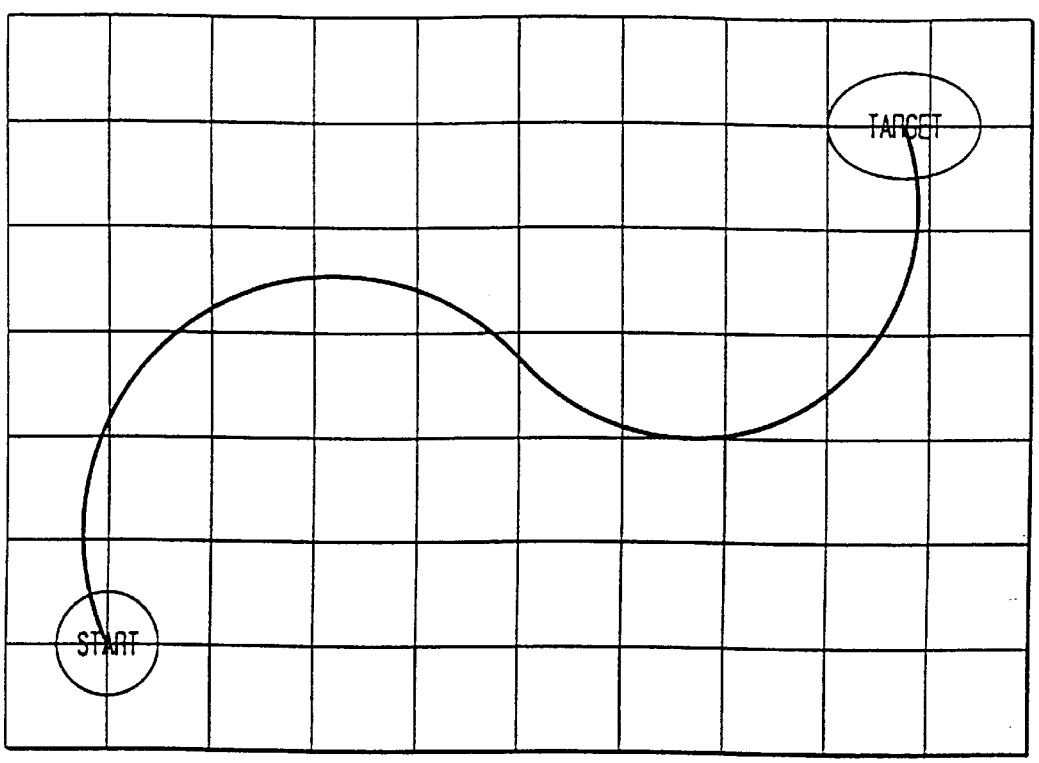
Figure 6:
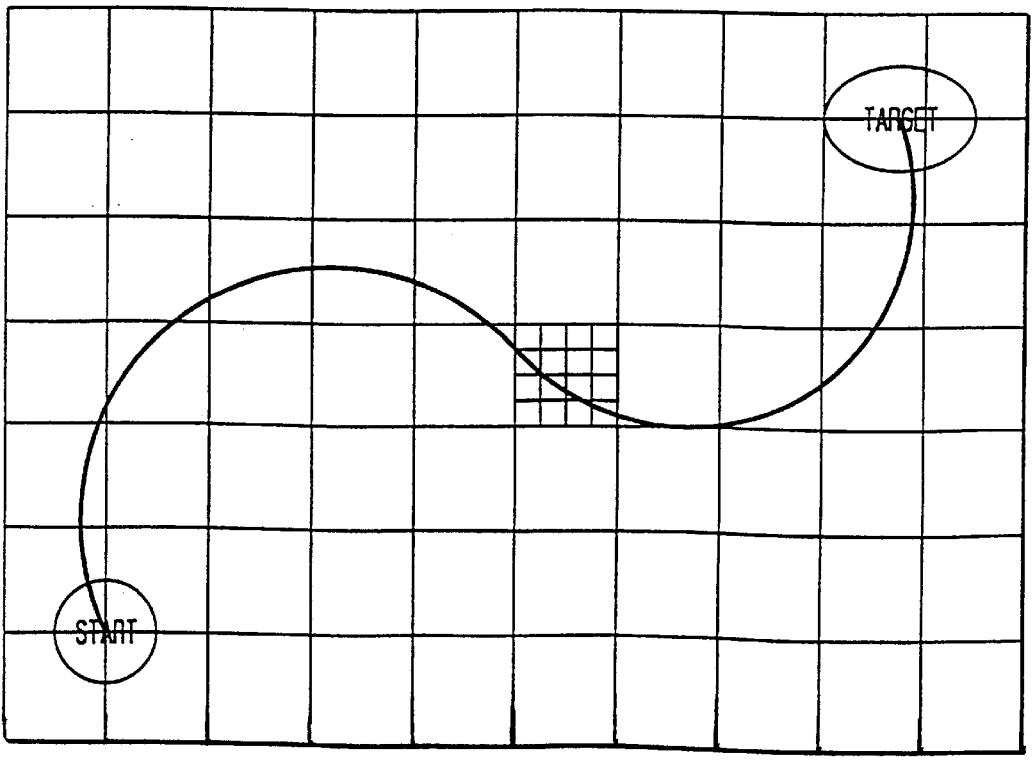
Figure 7:
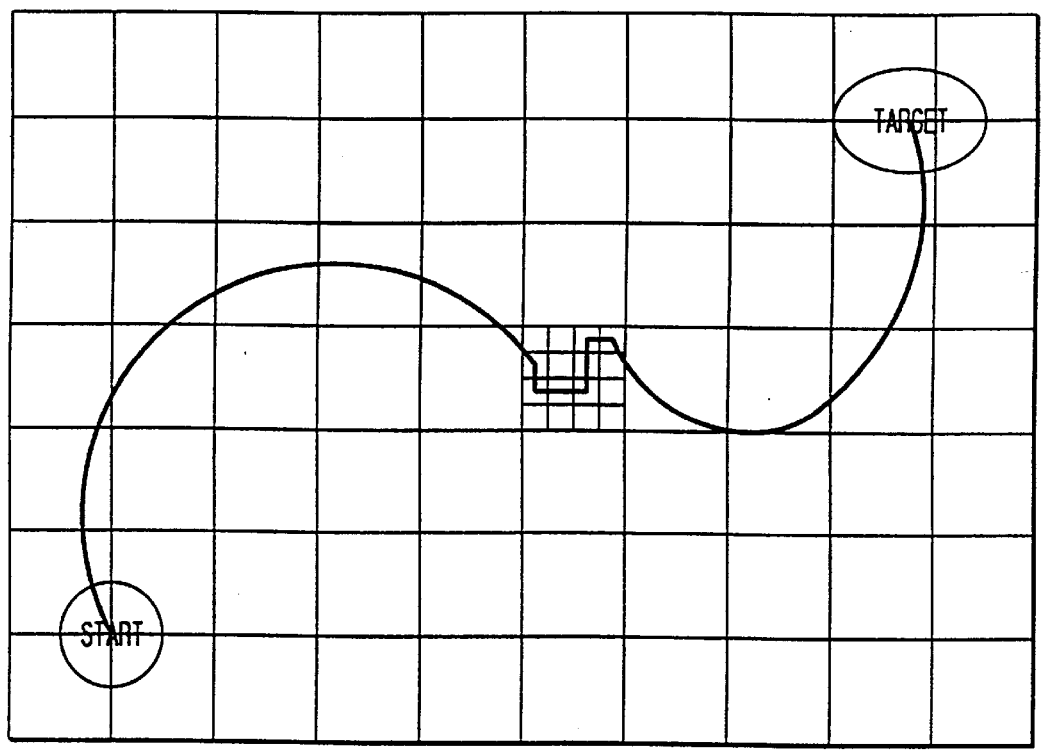

FIG. 4, (numeral 16) depicts the optimal (minimum cost) global path from the initial point (start) to the final point (target). FIG. 5, numeral 18, illustrates the superimposed global grid on the terrain to be traversed. FIG. 6, numeral 20, exhibits a hierarchical grid imposed on a local cell of the terrain resulting in grid refinement. FIG. 7, numeral 22, depicts the locally refined path on the terrain in the above cell, based on local observations mapped into the refined local grid. FIG. 8, numeral 24–52, presents the general flowchart of the complete procedure which describes the method generating the minimum-cost-path trajectory for the vehicle.

What is claimed:

1. A method suitable for use for optimizing an operation of a self-guided vehicle, the method comprising the steps of:
   (i) incorporating a self-guided capability as part of the operation of the vehicle comprising at least one mapping technique for soliciting information required for vehicle motion from a first to a predetermined second location;
   (ii) dynamically assessing a global optimal path referenced to said first and second location based on said at least one mapping technique; and
   (iii) dynamically affecting vehicle motion by first reevaluating step (ii) global optimal path in light of instant vehicle motion and secondly refining said global optimal path so that the vehicle motion can follow a localized path trajectory which can optimize the refined global path.

2. A method according to claim 1, wherein step (i) comprises incorporating a self-guided capability by providing at least one sensor.

3. A method according to claim 2, comprising the step of providing at least one sensor selected from the group consisting of an electromagnetic sensor, a chemical sensor, and an audio sensor.

4. A method according to claim 1, wherein at least one mapping technique comprises utilizing a topographic map referencing said first and second locations.

5. A method according to claim 1, wherein the global optimal path comprises selecting a cost function.

6. A method according to claim 5, comprising a step of selecting a cost function that subsumes at least one of transit-time of vehicle operation, fuel consumption of vehicle operation, and responding to mechanical, electrical, or chemical constraints.

7. A method according to claim 5, wherein step (ii) comprises assessing a pertinent cost function in light of instant vehicle motion for dynamically assessing the global optimal path.

8. A program storage device readable by a machine, tangibly embodying a program of instructions executable by the machine to perform method steps for optimizing an operation of a self-guided vehicle, said method steps comprising:

(i) incorporating a self-guided capability as part of the operation of the vehicle comprising at least one mapping technique for soliciting information required for vehicle motion from a first to a predetermined second location;

(ii) dynamically assessing a global optimal path referenced to said first and second location based on said at least one mapping technique; and (iii) dynamically affecting vehicle motion by first reevaluating step (ii) global optimal path in light of instant vehicle motion and secondly refining said global optimal path so that the vehicle motion can follow a localized path trajectory which can optimize the refined global path.

9. A computer system suitable for use for optimizing an operation of a self-guided vehicle, the computer system comprising:

(i) means for inputting information required for a self-guided operation of the vehicle;

(ii) CPU means for operating on the input information for generating a map required for vehicle motion from a first to a second predetermined location;

(iii) CPU means for converting information in the map into first motion instructions to the self-guided vehicle;

(iv) CPU means for dynamically assessing a global optimal path referenced to said first and second locations based on the at least one mapping technique;

(v) CPU means for dynamically affecting vehicle motion by first reevaluating the global optimal path in light of instant vehicle motion and secondly refining said global optimal path so that the vehicle motion can follow a localized path trajectory which can optimize the refined global path; and (vi) CPU means for converting the localized path trajectory into second motion instructions to the self-guided vehicle.

* * * * *